(12) United States Patent
Lee

(10) Patent No.: US 10,545,271 B2
(45) Date of Patent: Jan. 28, 2020

(54) DISPLAY PANEL ASSEMBLY AND ELECTRONIC EQUIPMENT INCLUDING THE SAME

(71) Applicant: Samsung Display Co., Ltd., Yongin-si, Gyeonggi-do (KR)

(72) Inventor: Hyun-Hee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/004,649

(22) Filed: Jan. 22, 2016

(65) Prior Publication Data

US 2016/0139310 A1 May 19, 2016

Related U.S. Application Data

(63) Continuation of application No. 13/777,898, filed on Feb. 26, 2013, now Pat. No. 9,268,068.

(30) Foreign Application Priority Data

Sep. 13, 2012 (KR) .................. 10-2012-0101800

(51) Int. Cl.
*G02B 5/28* (2006.01)
*G02B 5/08* (2006.01)
*G02B 5/00* (2006.01)

(52) U.S. Cl.
CPC ............. *G02B 5/286* (2013.01); *G02B 5/003* (2013.01); *G02B 5/0825* (2013.01)

(58) Field of Classification Search
CPC .......... G02B 5/08; G02B 1/10; G02B 5/0841; G02B 5/305; G02B 1/11; G02B 5/0825;
(Continued)

(56) References Cited

U.S. PATENT DOCUMENTS 6,903,506 B2 * 6/2005 Kita .................... H01L 51/5036
  313/112
8,305,688 B2 11/2012 Huang
(Continued)

FOREIGN PATENT DOCUMENTS

JP     9-90327 A      4/1997
JP  2008-83262 A     4/2008
(Continued)

OTHER PUBLICATIONS

Japanese Office Action dated Aug. 2, 2016 for Japanese Patent Application No. JP 2012-261383, which shares priority of Korean Patent Application No. KR 10-2012-0101800 with subject U.S. Appl. No. 15/004,649, and cites the above-identified references numbered 1-2.

(Continued)

*Primary Examiner* — Jade R Chwasz
(74) *Attorney, Agent, or Firm* — Lewis Roca Rothgerber Christie LLP

(57) ABSTRACT

A display panel assembly and an electronic device including the assembly are disclosed. In one aspect, the assembly includes a window cover including a display area and a non-display area and a display panel disposed on a location of a rear surface of the window cover corresponding to the display area. The assembly further includes a dielectric mirror layer disposed on a location of the rear surface of the window cover corresponding to the non-display area which selectively reflects light incident through the window cover to provide a metallic color sense to a user and a light absorbing layer absorbing light transmitted through the dielectric mirror layer.

20 Claims, 5 Drawing Sheets

(58) Field of Classification Search
CPC ... G02B 5/0858; G02B 5/0866; G02B 5/0875
USPC .......................................... 359/838, 839, 884
See application file for complete search history.

(56) References Cited

U.S. PATENT DOCUMENTS

| | | | |
|---|---|---|---|
| 2009/0154198 | A1 | 6/2009 | Lee et al. |
| 2012/0026107 | A1* | 2/2012 | Kim .................. G06F 3/044 345/173 |
| 2012/0081406 | A1 | 4/2012 | Li et al. |
| 2012/0162106 | A1 | 6/2012 | Choi et al. |
| 2012/0229893 | A1* | 9/2012 | Hebrink ................ G02B 1/04 359/359 |

FOREIGN PATENT DOCUMENTS

| | | |
|---|---|---|
| JP | 2008-83423 A | 4/2008 |
| JP | 2010-173090 A | 8/2010 |
| JP | 2011-13546 A | 1/2011 |
| KR | 10-2005-0070872 A | 7/2005 |
| KR | 10-2005-0098578 A | 10/2005 |
| KR | 10-2005-0106948 A | 11/2005 |
| KR | 10-2009-0064264 A | 6/2009 |
| KR | 10-2010-0009060 A | 1/2010 |
| KR | 10-2012-0010828 A | 2/2012 |
| KR | 10-2012-0075103 A | 7/2012 |

OTHER PUBLICATIONS

Korean Office Action dated Dec. 24, 2013 for Korean Patent Application No. KR 10-2012-0101800 from which priority is claimed by subject U.S. Appl. No. 15/004,649.

Korean Notice of Allowance dated May 3, 2014 for Korean Patent Application No. KR 10-2012-0101800 from which priority is claimed by subject U.S. Appl. No. 15/004,649.

Japanese Office Action dated Apr. 4, 2017 for Japanese Patent Application No. JP 2012-261383, which shares priority of Korean Patent Application No. KR 10-2012-0101800 with subject U.S. Appl. No. 15/004,649, and which cites the above-identified reference numbered 1.

* cited by examiner

DISPLAY PANEL ASSEMBLY AND ELECTRONIC EQUIPMENT INCLUDING THE SAME

CROSS-REFERENCE TO RELATED PATENT APPLICATION

This application is a continuation of U.S. patent application Ser. No. 13/777,898, filed Feb. 26, 2013. Application Ser. No. 13/777,898 claimed the benefit of Korean Patent Application No. 10-2012-0101800, filed on Sep. 13, 2012, in the Korean Intellectual Property Office, the disclosure of which is incorporated herein in its entirety by reference.

BACKGROUND

1. Field

The described technology generally relates to a display panel assembly and electronic equipment including the same.

2. Description of the Related Technology

As demands for electronic devices such as a mobile phone, a tablet computer, and the like increase, demands for electronic devices of various outer shapes and colors has also increased.

The demands of users for various outer shapes of the electronic devices may be satisfied by designing the electronic devices using curves and straight lines in combination, and the demands of users for various colors may be satisfied by varying kinds of paints used in manufacture of the electronic devices, but it is limited to develop a paint providing a sense of texture in addition to a color.

SUMMARY

One inventive aspect is a display panel assembly and electronic equipment including the same that may provide metallic colors.

Another aspect is a display panel assembly including a window cover including a display area and a non-display area; a display panel disposed on a location of a rear surface of the window cover corresponding to the display area; a dielectric mirror layer disposed on a location of the rear surface of the window cover corresponding to the non-display area which selectively reflects light incident through the window cover to provide a metallic color sense to a user; and a light absorbing layer absorbing light transmitted through the dielectric mirror layer.

The dielectric mirror layer may be formed of alternating layers of high-refractive-index layers and low-refractive-index layers.

The dielectric mirror layer may include a first dielectric layer located on the rear surface of the window cover; a second dielectric layer located on the first dielectric layer; and a third dielectric layer located on the second dielectric layer.

Thicknesses of the first, second, and third dielectric layers may be different from one another.

Refractive indexes of the first and third dielectric layers may be smaller than a refractive index of the second dielectric layer.

Refractive indexes of the first and third dielectric layers may be larger than a refractive index of the second dielectric layer.

The light absorbing layer may be a black printing layer.

The dielectric mirror layer may include a dielectric layer including titanium dioxide ($TiO_2$); and a dielectric layer including silicon dioxide ($SiO_2$).

The dielectric mirror layer may include an uneven surface.

The display panel assembly may further include a molding layer located between the rear surface of the window cover and the dielectric mirror layer, wherein a surface of the molding layer facing the dielectric mirror layer is an uneven surface.

Another aspect is a display panel assembly including a window cover including a display area and a non-display area formed on a perimeter around the display area; an organic light emitting display panel disposed at a location of a rear surface of the window cover corresponding to the display area; a dielectric mirror layer disposed on a location of the rear surface of the window cover corresponding to the non-display area, includes a plurality of dielectric layers, and selectively reflects light that corresponds to a wavelength satisfying conditions of constructive interference from light incident through the window cover; and a light absorbing layer disposed on the dielectric mirror layer and absorbing light that transmitted the dielectric mirror layer.

A first dielectric layer and a second dielectric layer, wherein one of the first and second dielectric layers may be a relatively high-refractive-index layer and the other may be a low-refractive-index layer.

The dielectric mirror layer may include a dielectric layer including titanium dioxide ($TiO_2$); and a dielectric layer including silicon dioxide ($SiO_2$).

The display panel assembly may further include a molding layer located between the rear surface of the window cover and the dielectric mirror layer, wherein a surface of the molding layer facing the dielectric mirror layer is an uneven surface.

Another aspect is an electric equipment including a housing having at least one open surface; and a display panel assembly disposed as to cover the open surface of the housing, wherein the display panel assembly includes a window cover including a display area and a non-display area formed on a perimeter around the display area; an organic light emitting display panel disposed at a location of a rear surface of the window cover corresponding to the display area; a dielectric mirror layer disposed on a location of the rear surface of the window cover corresponding to the non-display area, includes a plurality of dielectric layers, and selectively reflects light incident through the window cover; and a light absorbing layer absorbing light that transmitted the dielectric mirror layer.

The dielectric mirror layer may include alternately stacked dielectric layers of high refractive indexes and dielectric layers of low refractive indexes.

The dielectric mirror layer may include a first dielectric layer located on the rear surface of the window cover; a second dielectric layer located on the first dielectric layer; and a third dielectric layer located on the second dielectric layer, wherein refractive indexes of the first and third dielectric layers is either larger or smaller than a refractive index of the second dielectric layer.

The light absorbing layer may be a black printing layer.

The electric equipment may further include a film attached on the rear surface of the window cover using an adhesive; and a molding layer formed on a rear surface of the film, between the rear surface of the window cover and the dielectric mirror layer.

A surface of the molding layer facing the dielectric mirror layer may be an uneven surface, and the dielectric mirror layer may include a bumpy surface formed in correspondence to the bumpy surface of the molding layer.

DETAILED DESCRIPTION

Expressions such as "at least one of," when preceding a list of elements, modify the entire list of elements and do not modify the individual elements of the list.

Hereinafter, embodiments will be described in detail with reference to the attached drawings. This invention may, however, be embodied in many different forms and should not be construed as limited to the embodiments set forth herein. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

Figure 1:
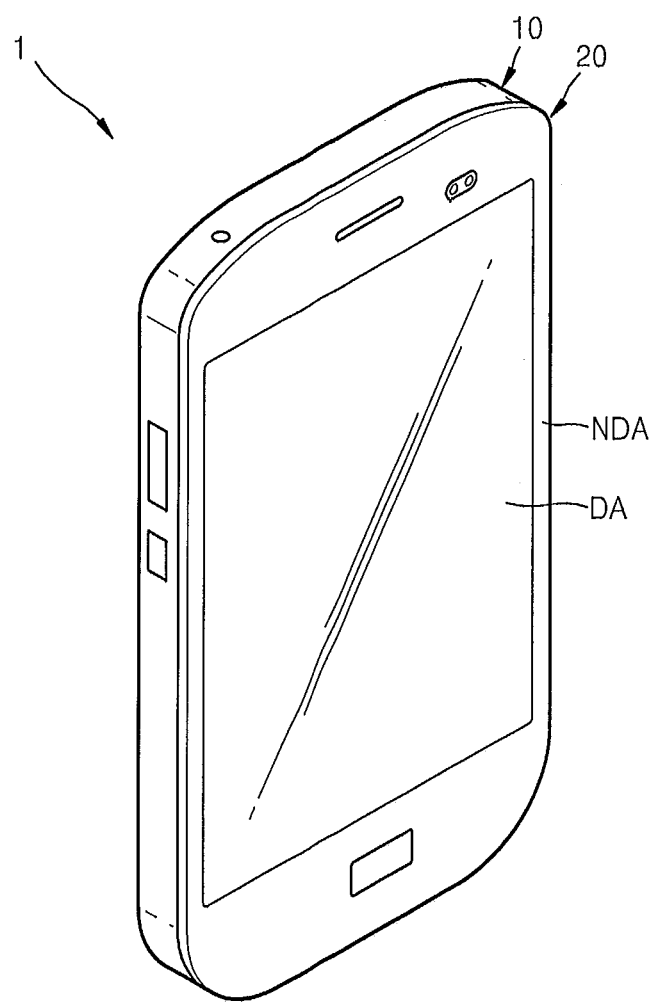
FIG. 1 is a perspective view schematically illustrating an electronic device installed with a display panel assembly according to an embodiment.
Figure 2:
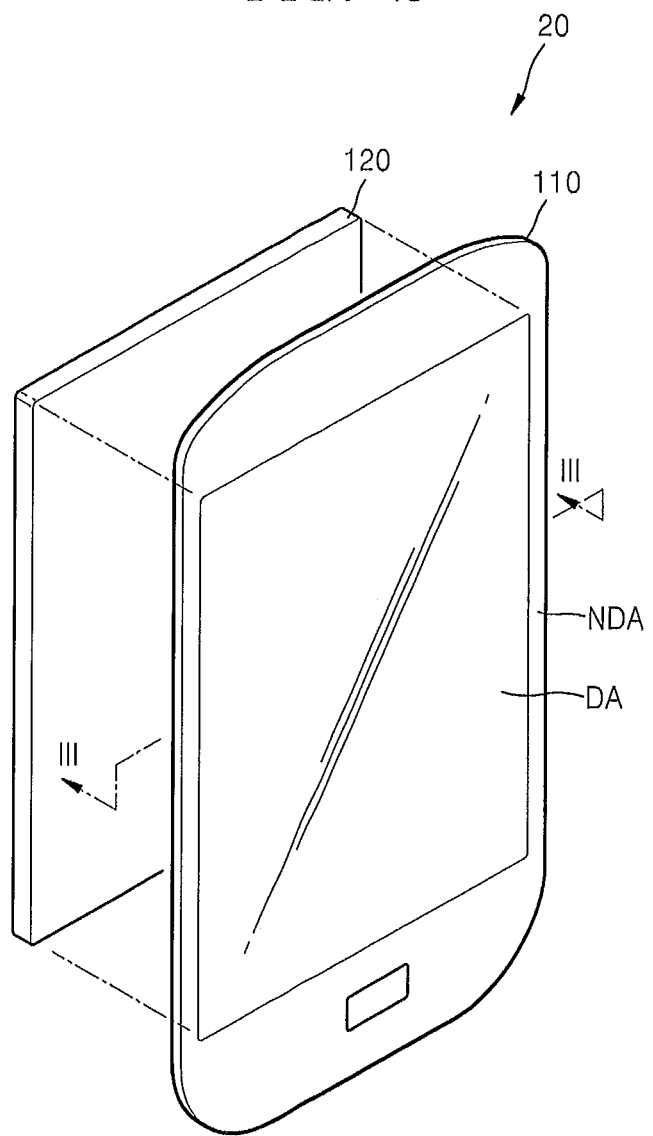
FIG. 2 is an exploded perspective view of the display panel assembly illustrated in FIG. 1.
Figure 3:
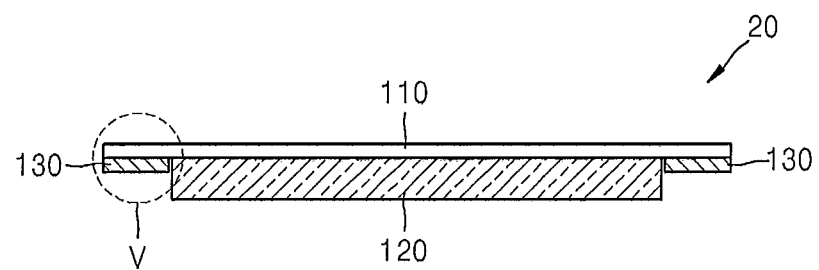
FIG. 3 is a cross-sectional taken along line III-III of FIG. 2.

FIG. 1 is a perspective view schematically illustrating an electronic device 1 installed with a display panel assembly 20 according to an embodiment. FIG. 2 is an exploded perspective view of the display panel assembly 20 illustrated in FIG. 1. FIG. 3 is a cross-sectional taken along line III-III of FIG. 2.

Referring to FIG. 1, the electronic device 1 may include a housing 10 having at least one open surface, and a display panel assembly 20. The electronic device 1 may be a portable electronic device such as a mobile phone or a tablet computer, but is not limited thereto.

The housing 10 has at least one surface thereof opened, and the open surface of the housing 10 may be covered by the display panel assembly 20. Elements related to driving the electronic device 1, such as a battery or a terminal to communicate with an external base station may be installed in the housing 10.

Referring to FIGS. 1 to 3, the display panel assembly 20 may include a window cover 110, and a display panel 120 and an opaque layer 130 each disposed on a rear surface of the window cover 110. Although not shown, the rear surface of the display panel 120 may further include a cover (or bezel) to protect the display panel 120.

The window cover 110 includes a display area DA and a non-display area NDA, which is formed on a perimeter around (circumference of) the display area DA. The display panel 120 may be disposed on a location corresponding to the display area DA, and the opaque layer 130 may be disposed on a location corresponding to the non-display area NDA.

The window cover 110 includes a transparent material. For example, the window cover 110 may include a glass substrate or a polymer substrate. The polymer substrate may include polyimide, but is not limited thereto.

The display panel 120 is disposed on a location corresponding to the display area DA of the window cover 110, and the display panel 120 may be attached to the rear surface of the window cover 110 using an adhesive. The display panel 120 may be an organic light emitting display panel, but is not limited thereto. For example, the display panel 120 may be a liquid crystal display panel.

In one embodiment, the opaque layer 130 is disposed on the location corresponding to the non-display area NDA of the window cover 110, and thus light incident through the window cover 110 may be selectively reflected to provide a metallic color sense to a user. In this regard, the opaque layer 130 includes a dielectric mirror layer 134 (see FIG. 5), and an overall construction of the opaque layer 130 will be described in detail at corresponding parts with reference to FIGS. 5 to 7.

Figure 4:
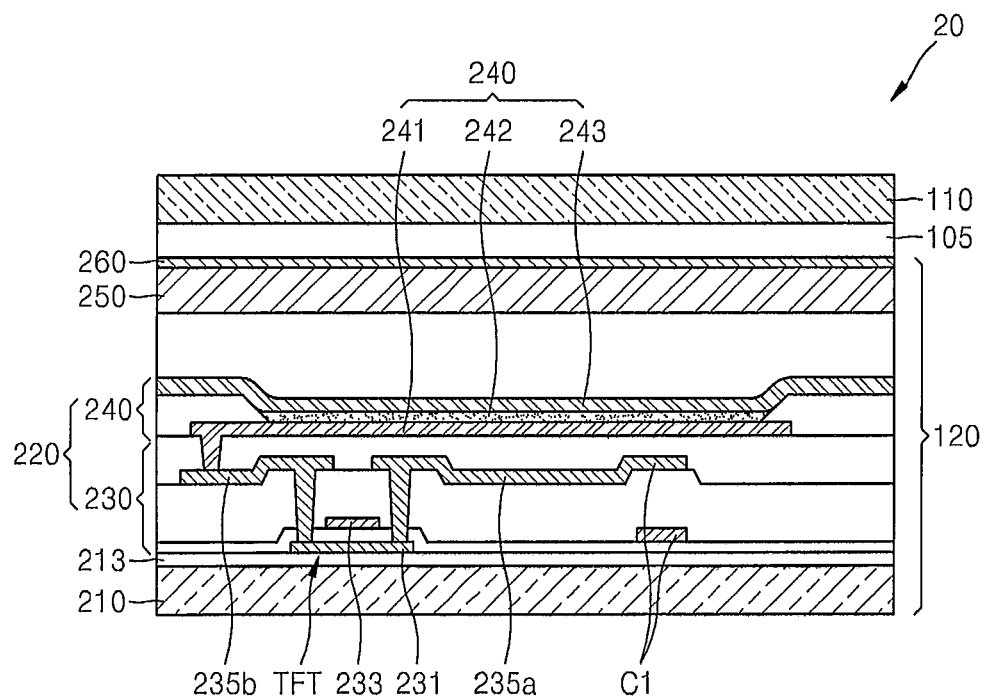
FIG. 4 is a magnified cross-sectional view taken from a part of the display area of the display panel assembly according to an embodiment.

FIG. 4 is a magnified cross-sectional view taken from a part of the display area DA of the display panel assembly 20 according to an embodiment.

Referring to FIG. 4, the display area DA of the display panel assembly 20 may include a display panel 120 disposed on the rear surface of the window cover 110, and the display panel 120 may be attached to the rear surface of the window cover 110 using an adhesive 105. The display panel 120 may include a first substrate 210, a display device 220 disposed on the first substrate 210, a second substrate 250 formed on the display device 220, and an optical film 260 formed on the second substrate 250.

The display element 220 includes an organic light emitting device 240 including a pixel electrode 241, a counter electrode 243 disposed on the pixel electrode 241, and an organic emitting layer 242 interposed between the pixel electrode 241 and the counter electrode 243. The organic light emitting device 240 emits red, green, or blue light according to electrical current flow in order to display predetermined image information. The organic light emitting device 240 may be disposed on a device/wiring layer 230. In this embodiment, the organic light emitting device 240 may emit red, green, or blue light, but is not limited thereto. For example, the organic light emitting device 240 may emit red, green, blue, or white light.

The first substrate 210 may include a polymer having excellent thermostability and durability or may be a glass substrate. The device/wiring layer 230 may include a driving thin film transistor TFT that is capable of driving the organic light emitting device 240, a switching thin film transistor (not shown), a reservoir capacitor C1, and wirings (not shown) electrically connected to the transistors and/or the reservoir capacitor C1. The driving thin film transistor TFT includes an active layer 231, a gate electrode 233, and source and drain electrodes 235a and 235b.

In one embodiment, a barrier film 213 is interposed between the first electrode 210 and the device/wiring layer 230 to prevent external foreign substances, such as moisture or oxygen, from transmitting through the first substrate 210 and penetrating into the organic light emitting device 240.

The organic light emitting device 240 may be disposed on the device/wiring layer 230. The organic light emitting device 240 includes the pixel electrode 241, the organic light emitting layer 242 disposed on the pixel layer 241, and the counter electrode 243 formed on the organic light emitting device 240.

In the current embodiment, the pixel electrode 241 may be an anode, and the counter electrode 243 may be a cathode, but the electrodes are not limited thereto, and the pixel electrode 241 may be a cathode, and the counter electrode may be an anode according to a driving method of the organic light emitting device. Holes and electrons are respectively injected from the pixel electrode 241 and the counter electrode 243 into the organic light emitting layer 242. Light is emitted as exitons, each of which is a bound pair of an electron and a hole, are relaxed from an excited state to a ground state.

The pixel electrode 241 is electrically connected to the driving thin film transistor that is formed on the device/wiring layer 230.

Although, a structure of the organic light emitting device 240 having the driving thin film transistor TFT disposed on the device/wiring layer 230 is described in the current embodiment, but the structure is not limited thereto and may be varied in various types. For example, the structure may have the pixel electrode 241 of the organic light emitting device 240 formed on the same layer with the active layer 231 of the thin film transistor TFT. As another example, the structure may have the pixel electrode 241 formed on the same layer with the gate electrode 233 of the thin film transistor TFT. Furthermore, structure may have the pixel electrode 241 formed on the same layer with the source and drain electrodes 235a and 235b. Also, although the driving thin film transistor TFT has a structure that the gate electrode 233 disposed on the active layer 231 in the current embodiment, but the structure is not limited thereto, and the gate electrode 233 may be disposed below the active layer 231.

The pixel electrode 241 included in the organic light emitting device 240 may be a reflective electrode, and the counter electrode 243 disposed facing the pixel electrode may be a transparent or semi-transparent electrode. Thus, light emitted from the organic light emitting layer 242 may transmit through the counter electrode 243.

The organic emitting layer 242 is disposed between the pixel electrode 241 and the counter electrode 243, and the organic light emitting layer 242 may be a low-molecular-weight organic material or a high-molecular-weight organic material. A middle layer, such as a hole transport layer (EIL), a hole injection layer (HIL), an electron transport layer (ETL), and an electron injection layer (EIL) may be optionally disposed as well as the organic light emitting layer 242 between the pixel electrode 241 and the counter electrode 243.

The second substrate 250 may cover the display device 220. The second substrate may be formed of a single substrate or have a structure of organic layers and inorganic layers that are alternately stacked.

The optical film 260 may be formed on the second substrate 250. At least one of a phase retardation plate and a polarizer may be used as the optical film 260. The optical film 260 may inhibit reflection of external light thus may increase visibility and contrast of the display panel 120.

Figure 5:
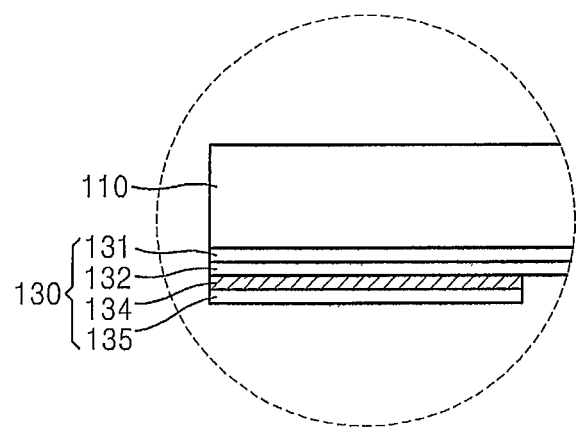
FIG. 5 is a magnified view of V of FIG. 3 which is a magnified cross-sectional view of the opaque layer according to an embodiment.

FIG. 5 is a magnified view of V of FIG. 3 which is a magnified cross-sectional view of the opaque layer 130 according to an embodiment.

Referring to FIG. 5, the opaque layer 130 may include the dielectric mirror layer 134 providing a metallic color sense to a user by selectively reflecting incident light through the window cover 110, and a light absorbing layer 135 formed on the dielectric mirror layer 134.

In an embodiment, the opaque layer 130 may be manufactured by sequentially forming the dielectric mirror layer 134 and the light absorbing layer 135 on a rear surface of a film 132. The opaque layer 130 manufactured in such manner may be attached to the rear surface of the window cover 110 through an adhesive layer 131.

The film 132 may include a transparent material so that the light incident through the window cover 110 may enter the dielectric mirror layer 134. For example, the film may be formed of polyethylene-etherphthalate, polyethylene-naphthalate, polycarbonate, polyarylate, polyether-imide, polyether-sulfone or polyimide, or the like.

The film 132 serves as a medium for disposing the dielectric mirror layer 134 and the light absorbing layer 135 on the rear surface of the window cover 110, which may be omitted according to stages of a process. For example, if the dielectric mirror layer 134 may be directly formed on the rear surface of the window cover 110, and the light absorbing layer 135 may be formed on the dielectric mirror layer 134, the film 132 may be omitted.

The dielectric mirror layer 134 may include a plurality of dielectric layers 341, 342, and 343 that have different refractive indexes. For example, the dielectric mirror layer 134 may include a first dielectric layer 341 formed on the rear surface of the window cover 110, a second dielectric layer 342 formed on the first dielectric layer 341, and a third dielectric layer 343 formed on the second dielectric layer 342.

In an embodiment, the refractive indexes of the first and third dielectric layers 341 and 343 may be formed larger than the refractive index of the second dielectric layer 342. That is, the dielectric mirror layer 134 may include the first dielectric layer 341 of a high refractive index, the second dielectric layer 342 of a low refractive index, and the third dielectric layer 343 of a high refractive index. For example, the first and third dielectric layers 341 and 343 may include titanium dioxide ($TiO_2$), and the second dielectric layer 342 may include silicon dioxide ($SiO_2$).

In another embodiment, the refractive indexes of the first and third dielectric layers 341 and 343 may be formed smaller than the refractive index of the second dielectric layer 342. That is, the dielectric mirror layer 134 may include the first dielectric layer 341 of a low refractive index, the second dielectric layer 342 of a high refractive index, and the third dielectric layer 343 of a low refractive index. For example, the first and third dielectric layers 341 and 343 may include silicon dioxide (SiO$_2$), and the second dielectric layer 342 may include titanium dioxide (TiO$_2$).

As described above, a metallic color sense may be provided to a user through the dielectric mirror layer 134 in which high-refractive-index layers and low-refractive-index layers are alternately formed. The dielectric mirror layer 134 including the dielectric layers 341, 342, and 343 may provide various metallic color senses based on interference of light reflected at an interface of each of the dielectric layers 341, 342, and 343.

For example, a part of the light incident through the window cover 110 is reflected by the dielectric mirror layer 134 and thus provides a metallic color sense to a user, and the rest of the light that is not reflected at the dielectric mirror layer 134 is absorbed by the light absorbing layer 135. In this regard, the light absorbing layer 135 may be a black printing layer. The light absorbing layer 135 may be formed by applying a black paint on the dielectric mirror 134 by using a method such as spray, screen printing, or the like.

Figure 6:
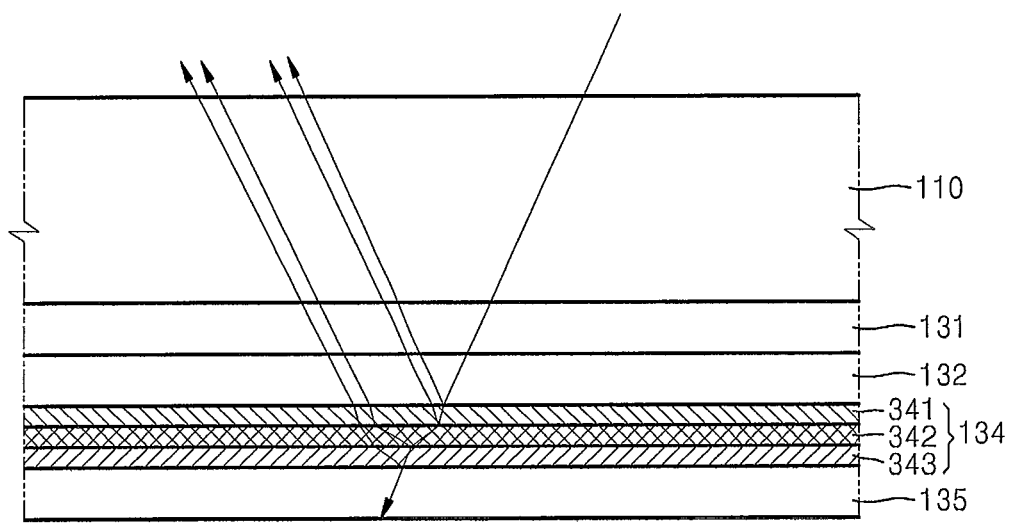
FIG. 6 is a conceptual view schematically illustrating a path of light incident through the opaque layer.

FIG. 6 is a conceptual view schematically illustrating a path of light incident through the opaque layer 130.

Referring to FIG. 6, the light incident through the window cover is white light that enters the dielectric mirror layer 134. In particular, a part of the light incident toward the first dielectric layer 341 is reflected, and the rest of the light is refracted and enters the second dielectric layer 342, a part of the light incident toward the second dielectric layer 342 is reflected, and the rest of the light is refracted and enters the third dielectric layer 343, and a part of the light incident toward the third dielectric layer 343 is reflected, and the rest of the light is refracted and enters the light absorbing layer 135.

Such light reflection occurs at an interface of each of the layers, and the light reflected at the interface of each of the layers is a light corresponding to a wavelength that satisfies conditions of constructive interference of the dielectric mirror layer 134, and the reflected light provides a metallic color sense to a user. The wavelength satisfying conditions of constructive interference is a wavelength within a band of a visible ray, and a user may recognize a color sense of the light reflected at the dielectric mirror layer 134. Meanwhile, the light that is not reflected at the interface of each layer of the dielectric mirror layer 134 and transmitted through the dielectric mirror layer 134 is absorbed by the light absorbing layer 135, which is a block printing layer.

The dielectric mirror layer 134 may provide various metallic color senses to a user by varying a number and a thickness of dielectric layers.

For example, when the dielectric mirror layer 134 includes the first dielectric layer 341 having a thickness of about 50 Å and including TiO$_2$, the second dielectric layer 342 having a thickness of about 300 Å and including SiO$_2$, and the third dielectric layer 343 having a thickness of about 350 Å and including TiO$_2$, the user may see a blue color of a metallic sense.

In another embodiment, when the dielectric mirror layer 134 includes the first dielectric layer 341 having a thickness of about 100 Å and including TiO$_2$, the second dielectric layer 342 having a thickness of about 300 Å and including SiO$_2$, and the third dielectric layer 343 having a thickness of about 1000 Å and including TiO$_2$, the user may see a brow color of a metallic sense.

In another embodiment, when the dielectric mirror layer 134 includes the first dielectric layer 341 having a thickness of about 200 Å and including TiO$_2$, the second dielectric layer 342 having a thickness of about 400 Å and including SiO$_2$, and the third dielectric layer 343 having a thickness of about 100 Å and including TiO$_2$, the user may see a silver color of a metallic sense.

Figure 7:
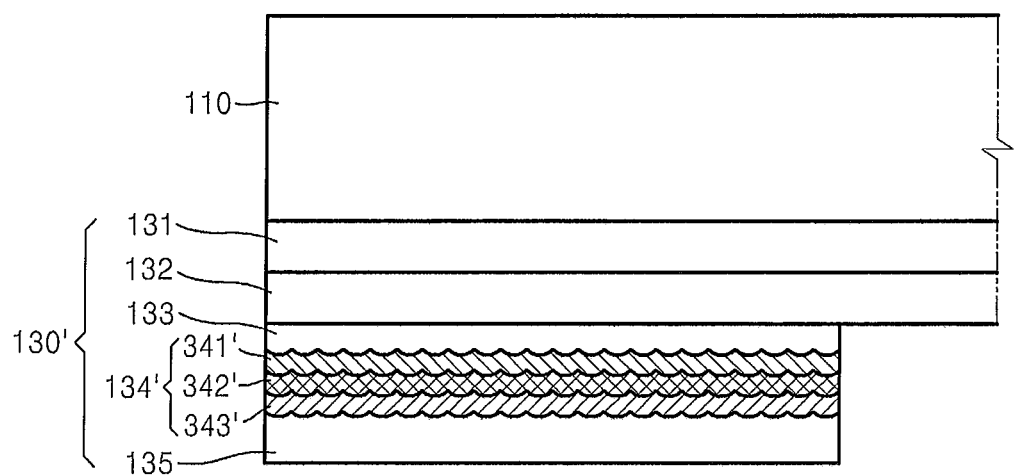
FIG. 7 is a magnified cross-sectional view of an opaque layer according to another embodiment.

FIG. 7 is a magnified cross-sectional view of an opaque layer 130' according to another embodiment.

Referring to FIG. 7, the opaque layer 130' may further include a molding layer 133. The molding layer 133 may be formed of a urethane acrylate based resin with a high transmissivity, and a bump may be formed on the rear surface of the molding layer 133. In other words, the rear surface of the molding layer 133 may be an uneven surface. The molding layer 133 may be applied on the rear surface of the film 132 and hardened by an ultraviolet (UV) ray to be manufactured.

As the molding layer 133 having an uneven surface is further included between the window cover 110 and the dielectric mirror layer 134, a dielectric mirror layer 134' directly formed on the molding layer 133 may also have an uneven surface. The bump/uneven surface of the dielectric mirror layer 134' may perform a function that scatter-reflecting light reflected at interfaces of the dielectric layers 341', 342', and 343'.

As described with reference to FIG. 6, the light incident on the dielectric mirror layer 134' is reflected at the interfaces of the dielectric layers 341', 342', and 343' forming the dielectric mirror layer 134', thereby providing a metallic color sense to a user. Here, the uneven surfaces are included in the interfaces of the dielectric layers 341', 342', and 343', thus the reflected light may be scatter-reflected in many directions. A user may be provided with a strong metallic color sense due to the scatter-reflection caused by the uneven surfaces.

As described above, a number of the dielectric layers constructing the dielectric mirror layer 134 or 134' is described as three, but the number is not limited thereto. For example, the dielectric mirror layer 134 or 134' may be constructed with two dielectric layers or at least four dielectric layers.

As described above, according to the one or more of the above embodiments, a display panel assembly and electric equipment may provide a metallic color sense to a user by selectively reflecting light incident through a window cover.

While the above embodiments have been described with reference to the accompanying drawings, it will be understood by those of ordinary skill in the art that various changes in form and details may be made therein without departing from the spirit and scope of the present invention as defined by the following claims.

What is claimed is:
1. A window for display device comprising:
   a transparent substrate including a display area and a non-display area surrounding the display area;
   an adhesive layer over the transparent substrate, the adhesive layer having a first width in a width dimension of the window;
   a resin layer including a main surface facing a major surface of the transparent substrate such that the adhesive layer is vertically-disposed between the major surface of the transparent substrate and the main surface of the resin layer;
   a multi-layer film over the resin layer such that the resin layer is vertically-disposed between the adhesive layer and the multi-layer film, the multi-layer film including at least one high-refractive-index layer and at least one low-refractive-index layer; and a light absorbing layer over the multi-layer film, and configured to at least partially absorb visible light transmitting through the multi-layer film, wherein the multi-layer film and the light absorbing layer are only disposed in the non-display area, wherein the multi-layer film is interposed between and overlaps both a bottom surface of the resin layer and a top surface of the light absorbing layer in a depth dimension of the window, and wherein the light absorbing layer has a second width in the width dimension of the window, the first width being greater than the second width.

2. The window for display device of claim 1, wherein the multi-layer film includes alternating layers of high-refractive-index layers and low-refractive-index layers.

3. The window for display device of claim 2, wherein the multi-layer film comprises:
a first dielectric layer;
a second dielectric layer on the first dielectric layer; and
a third dielectric layer located on the second dielectric layer,
wherein refractive indexes of the first and third dielectric layers are less than that of the second dielectric layer.

4. The window for display device of claim 1, wherein the multi-layer film comprises:
a first dielectric layer formed of titanium oxide; and
a second dielectric layer including silicon oxide.

5. The window for display device of claim 1, wherein the light absorbing layer includes a black pigment.

6. The window for display device of claim 1, wherein the resin layer is transparent.

7. A display device comprising:
a transparent substrate including a display area and a non-display area surrounding the display area;
a display panel disposed in the display area, and configured to display an image;
an adhesive layer on the transparent substrate, the adhesive layer having a first width in a width dimension of the transparent substrate;
a multi-layer film disposed only in the non-display area, the multi-layer film including at least one high-refractive-index layer and at least one low-refractive-index layer;
a resin layer vertically disposed between a major surface of the transparent substrate and a major surface of the multi-layer film that faces the major surface of the transparent substrate; and
a light absorbing layer over the multi-layer film, and configured to at least partially absorb visible light transmitting through the multi-layer film,
wherein the light absorbing layer is disposed only in the non-display area,
wherein the multi-layer film is interposed between and overlaps both a bottom surface of the resin layer and a top surface of the light absorbing layer in a depth dimension of the display device, and
wherein the light absorbing layer has a second width in the width dimension of the transparent substrate, the first width being greater than the second width.

8. The display device of claim 7, wherein the multi-layer film includes alternating layers of high-refractive-index layers and low-refractive-index layers.

9. The display device of claim 8, wherein the multi-layer film comprises:
a first dielectric layer;
a second dielectric layer on the first dielectric layer; and
a third dielectric layer located on the second dielectric layer,
wherein refractive indexes of the first and third dielectric layers are less than that of the second dielectric layer.

10. The display device of claim 7, wherein the multi-layer film comprises:
a first dielectric layer formed of titanium oxide; and
a second dielectric layer including silicon oxide.

11. The display device of claim 7, wherein the light absorbing layer includes a black pigment.

12. The display device of claim 7,
wherein the adhesive layer is closer to a bottom surface of the transparent substrate than a bottom surface of the resin layer.

13. The display device of claim 12, wherein the adhesive layer directly contacts a top surface of the resin layer and the bottom surface of the transparent substrate.

14. The display device of claim 7, wherein the multi-layer film directly contacts the bottom surface of the resin layer and the top surface of the light absorbing layer.

15. The display device of claim 7, wherein the resin layer is transparent.

16. The display device of claim 7, wherein the display panel has a third width, the third width being less than the first width.

17. A display device comprising:
a transparent substrate including a display area and a non-display area surrounding the display area;
a display panel disposed in the display area, and configured to display an image;
an adhesive layer on the transparent substrate, the adhesive layer having a first width in a width dimension of the transparent substrate;
a multi-layer film over the transparent substrate, the multi-layer film including at least one high-refractive-index layer and at least one low-refractive-index layer;
a light absorbing layer over the multi-layer film, and configured to at least partially absorb visible light transmitting through the multi-layer film; and
a resin layer vertically interposed between a major surface of the transparent substrate and a major surface of the light absorbing layer that faces the major surface of the transparent substrate,
wherein the multi-layer film and the light absorbing layer are only disposed in the non-display area, and
wherein the light absorbing layer has a second width in the width dimension of the transparent substrate, the first width being greater than the second width.

18. The display device of claim 17, wherein the multi-layer film comprises:
a first dielectric layer;
a second dielectric layer located on the first dielectric layer; and
a third dielectric layer located on the second dielectric layer,
wherein the first dielectric layer is closer to the transparent substrate than the third dielectric layer, and
wherein the third dielectric layer is closer to the light absorbing layer than the first dielectric layer.

19. The display device of claim 18, wherein refractive indexes of the first and third dielectric layers are less than that of the second dielectric layer.

20. The display device of claim 17, wherein the resin layer is transparent.

* * * * *